(12) United States Patent
Gershowitz et al.

(10) Patent No.: US 11,476,703 B2
(45) Date of Patent: Oct. 18, 2022

(54) EMERGENCY LIGHTING CONTROL BYPASS

(71) Applicant: Building Robotics, Inc., Oakland, CA (US)

(72) Inventors: Michael N. Gershowitz, San Jose, CA (US); Samuel Leung, Santa Clara, CA (US)

(73) Assignee: Building Robotics, Inc., Oakland, CA (US)

( * ) Notice: Subject to any disclaimer, the term of this patent is extended or adjusted under 35 U.S.C. 154(b) by 0 days.

(21) Appl. No.: 17/186,799

(22) Filed: Feb. 26, 2021

(65) Prior Publication Data
US 2022/0278549 A1    Sep. 1, 2022

(51) Int. Cl.
*H02J 9/06* (2006.01)
*H05B 47/18* (2020.01)

(52) U.S. Cl.
CPC .............. *H02J 9/065* (2013.01); *H02J 9/068* (2020.01); *H05B 47/18* (2020.01)

(58) Field of Classification Search
CPC ........... H02J 9/065; H02J 9/02; H02J 9/04–08
See application file for complete search history.

(56) References Cited

U.S. PATENT DOCUMENTS

| | | | | |
|---|---|---|---|---|
| 9,214,834 B1* | 12/2015 | Lunn | ...................... | H05B 47/17 |
| 2011/0181206 A1* | 7/2011 | Liess | ...................... | H02J 9/065 |
| | | | | 315/307 |
| 2012/0326614 A1* | 12/2012 | Tsuji | ...................... | H05B 45/10 |
| | | | | 315/200 R |
| 2013/0062969 A1* | 3/2013 | Gupta | ................ | H05B 41/2853 |
| | | | | 307/113 |
| 2017/0231069 A1* | 8/2017 | Winslett | .................. | H05B 45/31 |
| 2018/0128437 A1* | 5/2018 | Coombes | ............... | H05B 45/50 |
| 2018/0249557 A1* | 8/2018 | Pereira | ................ | H04L 12/4135 |

(Continued)

FOREIGN PATENT DOCUMENTS

| WO | WO-2020077954 A1 | * | 4/2020 |
| WO | WO-2021043601 A | * | 3/2021 |

OTHER PUBLICATIONS

"Application Note-Emergency solutions for Xitanium SR drivers and compatible sensors", Jul. 2020, Bodine. (Year: 2020).*

(Continued)

*Primary Examiner* — Rexford N Barnie
*Assistant Examiner* — David A Shiao (57) ABSTRACT

There is described an emergency lighting system for minimizing power leakage to assure proper operation of an emergency mode. The system comprises a digital addressable lighting bus having digital control lines, a driver, and a lighting control. The driver receives emergency power and provides the emergency power to a light emitter in response to detecting that the digital control lines are shorted. The lighting control receives normal power and includes a relay contact that shorts the digital control lines in response to detecting lack of the normal power. For another aspect, the driver and the lighting control are coupled to lighting control lines, which are either digital or analog control lines. For yet another aspect, a control bypass comprises a power unit, a relay coil, and a relay contact. The relay contact manages outputs of the power unit in response to activation and de-activation by the relay coil.

18 Claims, 5 Drawing Sheets

(56) References Cited

U.S. PATENT DOCUMENTS

2019/0067990 A1* 2/2019 Hermans ................ H05B 47/17
2019/0215920 A1* 7/2019 Clauberg ............... H05B 47/19

OTHER PUBLICATIONS

"Philips-Bodine GTD", Sep. 15, 2011, Philips Bodine. (Year: 2011).*
"Emergency Light", Nov. 19, 2015, Circuit Digest. (Year: 2015).*
"GTDU Installation Instructions", Dec. 5, 2019, Bodine. (Year: 2019).*
"GTDU Specifications", Nov. 2019, Bodine. (Year: 2019).*
"CMBC320-DALI-NA Load controller", Sep. 2014, Philips. (Year: 2014).*
"SC1008 ETC Installation Guide", Mar. 2017, ETC. (Year: 2017).*
English Machine Translation of WO2020/0077954 published Apr. 23, 2020. (Year: 2020).*

* cited by examiner

EMERGENCY LIGHTING CONTROL BYPASS

FIELD OF THE INVENTION

This application relates to the field of emergency lighting systems and, more particularly, to emergency lighting for analog and digital control systems.

BACKGROUND

Emergency lighting in commercial buildings is necessary to ensure the safe egress of occupants of the building if there is a power failure that disables normal lighting systems. Most regions have laws that mandate a minimum light level be maintained in the event of a power failure. With the advent of automatic lighting control systems, there must be method that ensures that the lighting control system is bypassed or disabled for light fixtures that are designated emergency lighting so that the fixture will turn on at the appropriate brightness during the power loss. If such a bypass were not present, it would be possible for the control to hold the fixture in a dimmed or off state even though the emergency power is supplied to the fixture during the loss of normal power condition. As a result, the occupants of the building may be endangered because the light levels on the emergency egress path may be too low for safe evacuation.

Traditionally, simple electromagnetic relays have been used to bypass the lighting controls. When these relays are energized by normal power, the relay contacts are in the non-bypassed or non-disabling position so that the lighting controls may function normally. When normal power is lost, the relay coil is de-energized and a spring in the relay will automatically place the relay contacts into the bypassed or disabling position so that the control system to turn off or dim the light will not be effective to the light fixture. Of course, a source of "emergency" or "normal/emergency" power must be provided to illuminate fixtures during the emergency, and the source of power is typically provided by a central battery, inverter, or standby generator system. This scheme of using a bypass relay is commonly referred to in the United States as "UL924" or a "UL924 Bypass Device" (defined in the standard 924 issued by Underwriters Laboratories in the United States) as a widely accepted method of evaluating and approving these relays to the satisfaction of the local governments.

For sophisticated UL924 devices, the relay coil may be preceded by a power supply. Doing this allows a single device to be used with many different line voltages. In the United States, the common line voltages are 120, 240, 277, 408 and 480 VAC while other areas of the world commonly use 230 VAC. The nature of relay coils is such that it is difficult to design a single coil to work over this large range of voltages (120~480 VAC) without the use of taps or multiple windings. If an error is made in connecting the windings or taps properly, the device may be irreparably damaged or otherwise fail to function properly. With the power supply, the device can easily cover a much wider input voltage range without any consideration by the installer. Typically, the range of 120~277 VAC is common, however the range of 120~480 VAC is technically feasible. With the advent of on premise photovoltaic solar power generation systems and battery storage, the use of DC power for lighting is becoming more common. DC voltages from 100 to 400 VDC are commonly utilized, and for the purposes of this disclosure the power sources may be either AC, DC or a combination of both.

As lighting control systems have continued to evolve the requirements of the relay contact have changed. Analog and digital dimming systems are commonly used for lighting control. Emergency bypass relays for analog dimming systems have normally open contacts that will open the control circuit when the normal power is lost. The normally open type of contact is also referred to as a "Form A" contact. An example of an analog dimming system is the 0-10V (also known as 1-10V) system, which is common in the United States. Emergency bypass relays for digital dimming systems have normally closed contacts that will close, or short out, the control circuit when the normal power is lost. The normally closed type of contact is also referred to as a "Form B" contact. An example of a digital dimming system is the Digital Addressable Lighting Interface ("DALI") system, which is common in Europe and is defined in the IEC 62386 family of standards. Some lighting controls are capable of operating with both analog and digital dimming systems. Such controls include a single relay, also referred to as a "Form C" contact, that has both a normally open portion and a normally closed portion with a common connection between them.

A DALI dimming system includes a two-wire DALI bus for managing signal and power for connected devices. Power is required for the two wires of the DALI bus and has been traditionally supplied by a separate device, commonly referred to as a power supply unit ("PSU"), although some manufacturers have integrated the PSU into the LED driver. While a driver providing power to the DALI bus was previously permitted by the DALI bus specifications (IEC 62386-101), it was not commonly done due to cost considerations. Traditional DALI bus systems spanned many fixtures and wired complete rooms or floors in a single bus configuration. Only one PSU is required for the entire bus and having PSUs in each driver would be difficult to manage and add unnecessary cost to the system. Recent efforts by the Digital Illumination Interface Alliance ("DiiA"), which now manages revisions to the DALI bus specification, have changed the use model of the DALI bus to provide for small DALI buses contained only within a single fixture, referred to as DALI for IoT ("D4i"). The integration of PSU into the driver is now encouraged under Part 250 of the DiiA specifications.

The DALI specification (IEC 62386-101) provides for a system failure state. This is the condition when the DALI bus power is lost for an extended amount of time (>550 msec). When this situation occurs, the LED drivers connected to the bus will automatically set their output to a pre-determined level. The drivers will do this even if they were previously commanded to turn the LED off or to a low dimmed level. Thus, the system failure state can be used to have the driver disable the lighting controls during an emergency condition and automatically set the light level of the fixture to a brightness appropriate for safe egress of the building. This can be achieved by either short circuiting the DALI signal wires or by disabling all DALI PSUs on the bus.

SUMMARY

In accordance with one embodiment of the disclosure, there is provided an efficient control bypass approach for emergency lighting systems. This approach provides a system and method to bypass and/or disable the lighting controls in a more cost-effective way than the conventional systems. The bypass control of an emergency lighting control combines the function of a power supply unit ("PSU")

of a digital system, such as a Digital Addressable Lighting Interface ("DALI") dimming system, and the shunt relay into one unit with the relay being energized by the PSU internal power supply. The system may be used for both DALI and 0-10V schemes without the need for special jumpers or configuration, reducing inventory costs for multiple models specific to each scheme. The single unit may be used with any supply voltage in the input range of the PSU reducing number of model types required, reducing wiring errors, lowering cost, and reducing the total physical size of the solution. The cost savings is achieved by reducing the number of components needed as well as simplifying the wiring so that fewer wiring errors occur, resulting in lower labor costs for installation.

One aspect is a control bypass of emergency lighting for minimizing power leakage to assure proper operation of an emergency mode. The control bypass comprises a power unit, a relay coil coupled to the power unit, and a relay contact coupled to the power unit and the relay coil. The power unit includes power inputs, one or more positive direct current outputs, and a negative direct current output. The relay coil includes one end coupled at least one positive direct current output and another end coupled to the negative direct current output. The relay contact is configured to connect a relay contact input to a first relay contact output in response to an activation by the relay coil and connect the relay contact input to a second relay contact output in response to a non-activation by the relay coil. The first relay contact output is associated with an analog control terminal of the control bypass, the second relay contact output is associated with the at least one positive direct current output of the power unit and a digital control terminal of the control bypass, and the relay contact input is associated with the negative direct current output of the power unit and a common terminal of the control bypass. The polarity of the output of the PSU may be reversed without affecting the operation, that is the negative direct current output of the power unit could be connected to the second relay contact output and a digital control terminal of the control bypass and the positive direct current output of the power unit could be connected to the relay contact input and the common terminal of the control bypass.

Another aspect is the emergency lighting system comprises a digital addressable lighting bus, a driver coupled to the digital addressable lighting bus, and a lighting control coupled to the digital addressable lighting bus. The digital addressable lighting bus includes digital control lines interconnecting bus units of the emergency lighting system. The driver receives emergency power from one or more power sources and provides the emergency power to a light emitter in response to detecting that the digital control lines of the digital addressable lighting bus are shorted. The lighting control receives normal power from the power source or sources. The lighting control includes a relay contact configured to short the digital control lines in response to detecting lack of the normal power from the power source or sources.

Yet another aspect is the emergency lighting system comprises a driver coupled to lighting control lines and a lighting control coupled to the lighting control lines. The lighting control lines are one of digital control lines or analog control lines. The driver receives emergency power from one or more power sources and provides the emergency power to a light emitter in response to output connectors corresponding to the digital control lines being shorted and output connectors corresponding to the analog control lines being open. The lighting control receives normal power from the power source or sources. The lighting control includes a relay contact configured to short the output connectors corresponding to the digital control lines and open the output connectors corresponding to the analog control lines in response to detecting lack of the normal power from the power source or sources.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Various technologies that pertain to systems and methods that facilitate control bypass of emergency lighting will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The control bypass of emergency lighting combines the function of a power supply unit ("PSU") of a digital system, such as a Digital Addressable Lighting Interface ("DALI") dimming system, and the shunt relay into one unit with the relay being energized by the PSU internal power supply. The combination of the PSU and the shunt relay allows the single unit to be used with any AC or DC supply voltage in the input range of the PSU reducing number of model types required, reducing wiring errors, lowering cost, and reducing the total physical size of the solution. The combination may fit to fixtures that have limited internal space for safety functions as well as reduce wiring errors due to incorrect selection of input voltage to relay coil rating. In addition, the control bypass combines the shunt relay into the same unit as the PSU and functions effectively due to the benefit of this approach.

The control bypass may reduce the cost of, and space taken by, a shunt relay by omitting the shunt relay. When the AC or DC power supply to the PSU is removed it will cause the "system failure" or emergency condition to occur. It should be noted, however, that this potential solution may not be acceptable to regulatory authorities out of concern that, even if the PSU is disabled because it has no input power, leakage currents from the driver(s) may still cause the DALI bus to "float" to a non-zero voltage. This condition may cause the driver(s) to not interpret the bus condition as the 'bus failure' state and allow the driver outputs to remain in their last controlled state, such as an off or very dim state. The relay of the control bypass eliminates any possibility that the DALI bus could float and, thus, proper illumination of the emergency fixture light source during an emergency is assured.

The control bypass may allow the unit to operate in emergency lighting systems that have one or more other PSUs internal to the DALI drivers or elsewhere in the system. When used in in such systems, the magnitude of the current supplied by the PSU of the control bypass is sufficient to operate the system alone while avoiding any damage to the other components in the system in the event that other PSUs are present and the current provided by the PSU of the control bypass is added to the current provided by the other PSUs. This is particularly important for DALI standard-compliant embodiments since the standard specifies a maximum current from all DALI PSUs combined, such as 250 milliamps. When the lighting control is de-energized by loss of normal AC or DC input power, the relay contacts of the control bypass close, assuring that any external PSUs will have their outputs shunted. The relay of the control bypass avoids any possibility of the DALI bus having voltage potential on it, and proper illumination of the emergency fixture light source during an emergency is assured.

The control bypass may be used for both DALI and 0-10V schemes, reducing inventory costs for multiple models specific to each scheme. The single model may be used with either scheme without the need for special jumpers or configuration, requiring only the proper connection to clearly labeled terminals or conductors ('Common' and 'DALI'—or—'Common' and '0-10V').

Figure 1:
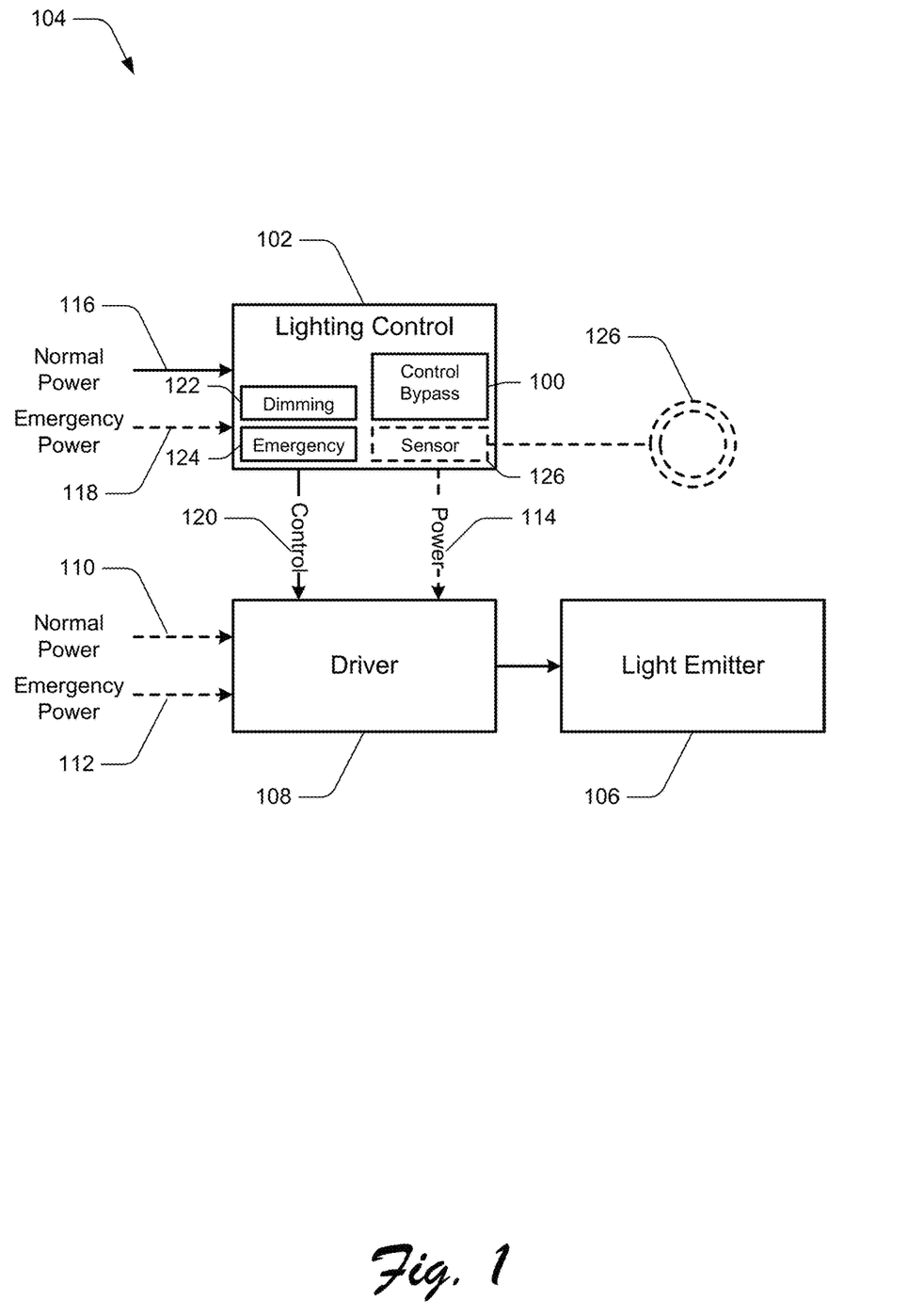
FIG. 1 is an illustration of an environment in an example implementation that is operable to employ techniques described herein.

Referring to FIG. 1, there is shown a high-level, conceptual illustration of a control bypass 100 of a lighting control 102 (also knowns as a lighting controller) as well as other associated components of an emergency lighting system 104 in an example implementation that is operable to employ techniques described herein. The emergency lighting system 104 includes one or more light emitters 106, one or more drivers 108 to manage power provided the light emitters, and one or more power sources 110,112 to provide power to the driver(s). Examples of light emitters 106 include, but are not limited to, fluorescent lamps, incandescent lamps, halogen lamps, gas-discharge lamps, light-emitting diodes ("LEDs"), and the like. Examples of drivers 108 include, but are not limited to, fluorescent ballasts, incandescent drivers, halogen drivers, gas-discharge lamp drivers, light-emitting diode ("LED") drivers, and the like.

There are a number of different ways to provide power to each driver 108 in emergency and non-emergency conditions. For some embodiments, each driver 108 may receive normal power from a normal power source at a first normal connection 110 or emergency power from an emergency power source at a first emergency connection 112. For some embodiments, the normal power 110 and emergency power 112 may be combined to a single connection by use of a device known as an Automatic Transfer Switch (ATS) or Generator Transfer Device (GTD) which is a part of the facility infrastructure and is not shown in FIG. 1. The illustration of normal power 110 and emergency power 112 as separate connections is for clarity of the logical function. In fact, if an ATS or GTD is used, as single connection, equivalent to the power connection 114 but coming from the facility rather than the lighting control 102 would take their place. For some embodiments, each driver 108 may receive normal or emergency power from the lighting control 102 at an intercomponent power connection 114, in which the lighting control forwards at least part of the power received from a normal power source at a second normal connection 116 or from an emergency power source at a second emergency connection 118. In this case, the lighting control 102 is performing the function of the ATS or GTD.

The lighting control 102 of the emergency lighting system 104 provides control information via an intercomponent control connection 120 to each driver 108 to ensure proper operation of the light emitters 106 for and emergency and non-emergency conditions. Examples of intercomponent control connections 120 include, but are not limited to, a digital addressable lighting bus, an analog control lighting bus, a phase-cut control lighting bus, and the like. The lighting control 102 receives power from a normal power source at the second normal connection 116. The lighting control 102 identifies a normal condition when power is detected at the second normal connection 116 and identifies an emergency condition, i.e., system failure, when power is not detected at the second normal connection. For some embodiments, the lighting control 102 may receive power at the second emergency connection 118 to maintain the lighting control 102 and/or driver 108 (via intercomponent power connection 114) active during the emergency operating condition.

The lighting control 102 includes various modules for operating lighting control system 104 during emergency and non-emergency conditions. In particular, the lighting control 102 includes a dimming module 122, an emergency module 124, and a control bypass 100. For some embodiments, the lighting control 102 may include one or more supplemental components 126, such as an internal or external environmental sensor. Examples of an environmental sensor, but not limited to these examples, are a proximal movement sensor and an ambient light level sensor. It should be noted that two or more modules 100, 122, 124, 126 may be combined into a single unit, or a single module may be distributed among multiple units, without impacting the functionality of these modules. One or more modules 100, 122, 124, 126 may provide control information to each driver 108 (via intercomponent control connection 120). The dimming module 122 provides dimming control data to the driver 108 for varying the illumination of the light emitter 106 during the non-emergency condition. The emergency module 124 provides emergency control data to the driver 108 for setting the illumination of the light emitter 106 at a particular illumination level during the emergency condition. In particular, when the emergency condition occurs and the driver 108 no longer receives power directly from the facility wiring, the emergency module 124 causes power to be restored to the driver via power connection 114. The control bypass 100 operates in conjunction with the emergency module 124 to ensure that the normal operating condition of the lighting control 102 is bypassed or disabled for light emitters 106 designated as emergency lighting so that they are active at the appropriate brightness during the emergency condition.

Figure 2:
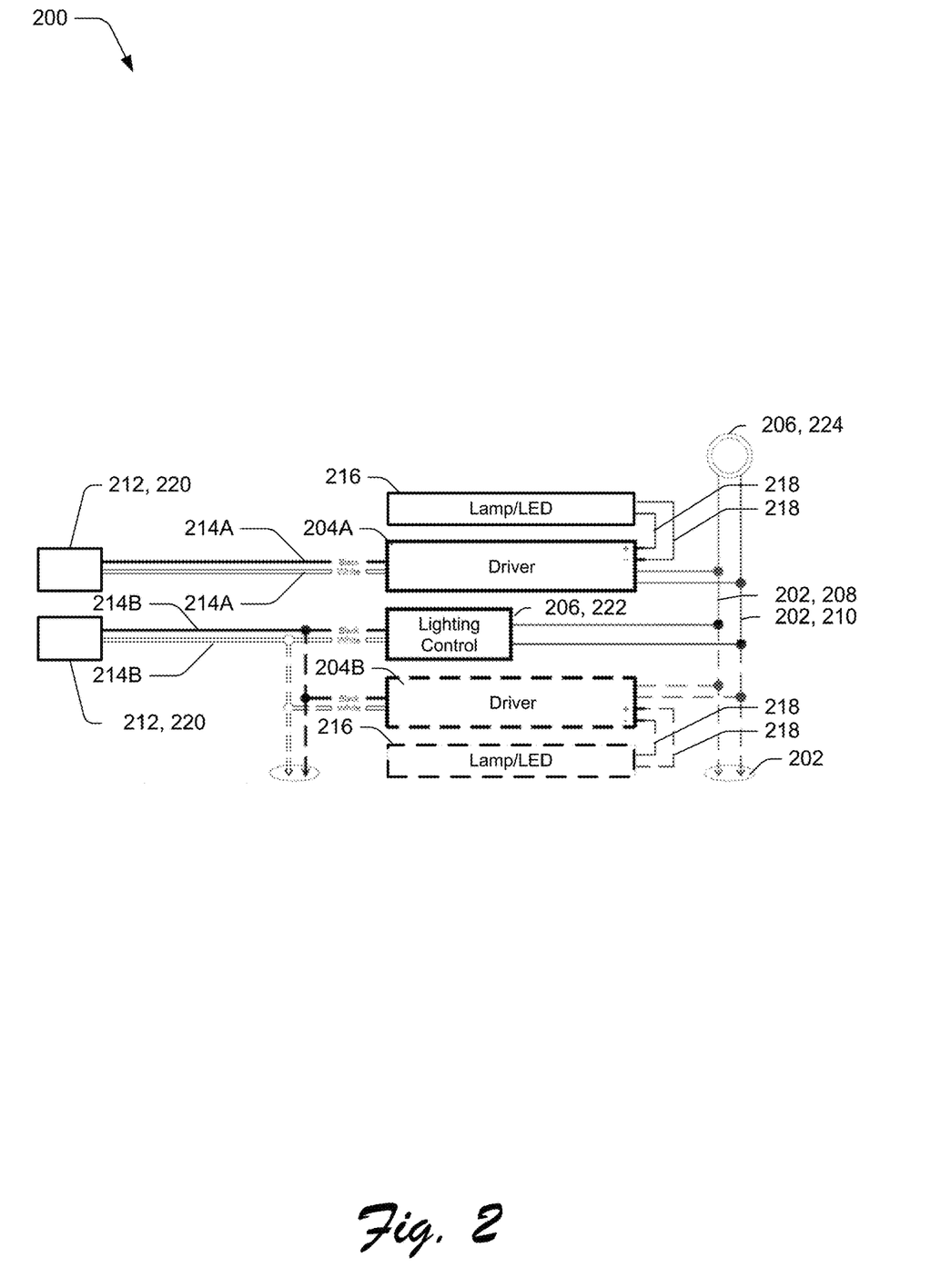
FIG. 2 depicts an example implementation of the environment of FIG. 1 as applied to a digital dimming system.

Referring to FIG. 2, there is shown an example digital implementation 200 of the emergency lighting system 104 as applied to a digital dimming system. The emergency lighting system 104 minimizes power leakage to assure proper operation of an emergency mode. The digital implementation 200 provides dimming, emergency, and bypass control by digital command, such as series of pulses. For some embodiments, the digital implementation 200 may provide power as well to other devices on the digital bus, commonly referred to as "bus units". For example, see the DALI bus specification, IEC 62386-101 section 3.11.

The digital implementation 200 comprises a digital addressable lighting bus 202, one or more drivers 204A, 204B coupled to the digital addressable lighting bus, and one or more lighting controls 206 coupled to the digital addressable lighting bus. The digital addressable lighting bus 202 includes at least two signal wires 208, 210, interconnected components such as drivers 204A, 204B and lighting controls 206, of the digital implementation 200. There is no difference between drivers 204A and 204B other than their connection to the power source. Drivers 204A are intended to provide power to the light source 216 during both emergency and normal operation. Drivers 204B are intended to provide power to the light source 216 only during normal operation.

Each emergency driver 204A receives power from an emergency/normal power source 212, 220 via power source lines 214A and providing the emergency power to a light emitter 216 via emitter power lines 218 in response to detecting that the digital control lines of the digital addressable lighting bus are shorted. The emergency/normal power source 212, 220 is comprised of power from the emergency source 212 or the normal source 220 via either the facility wiring using the ATS or GTD previously mentioned or via individual connections which may be combined at the fixture into the power connection 114 as described in FIG. 1 above.

For the digital implementation 200 shown in FIG. 2, the power source lines 214A, 214B providing power to the bus units 204, 206 are separate from the digital control lines 208, 210 for managing dimming, emergency, and bypass control for the emergency lighting system 104. Where there is more than one power source, each power source may be a normal power source 220, an emergency power source 212, or both, so the power source lines 214A may provide emergency power and/or normal power dependent on the embodiment. Specifically, the power source lines 214A, as illustrated by FIG. 2, may transfer normal power, emergency power, and/or both normal and emergency power. Also, the digital control lines 208, 210 of the digital addressable lighting bus 202 may provide power to one or more components but this aspect is not required for the digital implementation 200.

At least one bus unit 222 must be coupled to a normal power source 220 in order to detect an emergency condition due to lack of normal power. Other bus units that are not connected to the normal power source 220, such as a sensor 224, may manage dimming, emergency, and bypass control in conjunction with one or more other components, such as the connected lighting control 222 or the driver 204A, 204B. At least one driver 204A must be coupled to an emergency power source 212 in order to power the corresponding light emitter 216 during the emergency condition. The lighting control 206 is coupled to the digital addressable lighting bus 202, in which the lighting control receives normal power from the normal power source 220. The lighting control 206 includes a relay contact configured to short the digital control lines 208, 210 in response to detecting lack of the normal power from the normal power source 220.

Figure 3:
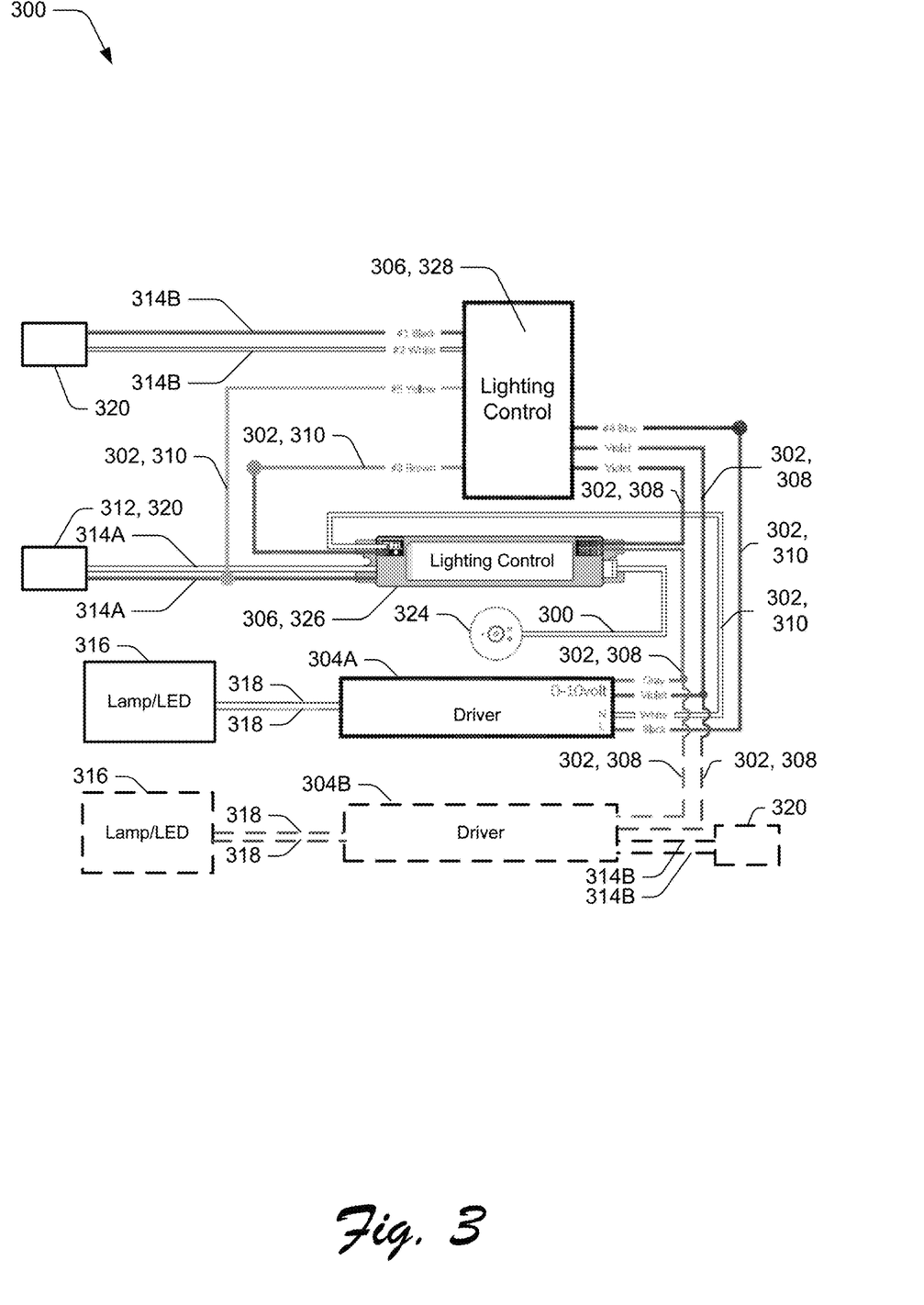
FIG. 3 depicts an example implementation of the environment of FIG. 1 as applied to an analog dimming system.

Referring to FIG. 3, there is shown an example analog implementation 300 of the emergency lighting system 104 as applied to an analog dimming system. The analog implementation 300 provides dimming, emergency, and bypass control by analog control, such as adjusting a control signal continuously between 0 volt to 10 volt levels. For the analog implementation 300, control is provided via analog control lines 302, 308 as opposed to the digital controls lines 208, 210 of the digital implementation 200.

The analog implementation 300 comprises analog power and control lines 302, one or more drivers 304A, 304B and one or more lighting controls 306. Drivers 304A are intended to provide power to the light source 316 during both emergency and normal operation. Drivers 304B are intended to provide power to the light source 316 only during normal operation. In addition to the difference in the connection to the power source between drivers 304A and 304B, drivers 304B must be of the 'dim-to-off' type, so that they may be turned off only via the analog control 308 during normal operation. During emergency operation drivers 304B and their associated light source 316 will be off as they have no source of power since they are only connected to the normal power source 320. Each driver 304A, is coupled to analog power and control lines 302, specifically analog control lines 308 and analog power lines 310. Each driver 304A receives emergency power via the analog power lines 310 from one or more lighting controls 306, in which the emergency power originates from at least one emergency power source 312 and is provided to the lighting controls via analog power line 314A. In receiving the emergency power, each driver 304A provides the emergency power to a light emitter 316 via an emitter power line 318 during an emergency condition. Each driver 304A performs these functions in response to an open circuit to the analog control lines 308 in at least one lighting control 306, which indicates an emergency condition to the driver by the analog control lines 308 being open circuited. During a normal (non-emergency) condition, each lighting control 306 is coupled to at least one driver 304A, 304B via the analog control lines 308 and receives normal power from the one or more normal power sources 320 via the analog power line 314A, 314B. Dimming of the drivers is achieved via the analog control lines which are not open circuited during normal operation.

Where there is more than one power source, each power source may be a normal power source 320, an emergency power source 312, or both, so the power source lines 314A may provide emergency power and/or normal power dependent on the embodiment. The power source lines 314A, as illustrated by FIG. 3, may transfer normal power, emergency power, and/or both normal and emergency power.

For the analog implementation 300 shown in FIG. 3, the power source lines 314B provide power from the normal power source 320 to the lighting controls 328, and the analog power lines 310 provide power from one lighting control 326 to another lighting control 328, to a driver 304, and/or to a supplement component 324, such as an internal or external environmental sensor. For embodiments where there are more than one lighting control 306, management of dimming, emergency, and bypass control for the emergency lighting system 104 may be shared by these lighting controls. For example, one lighting control 326 may manage dimming control and another lighting control 328 may manage emergency and bypass control. For each lighting control 328 that manages emergency control and/or bypass control, the lighting control determines an emergency condition based on power or lack thereof from a connected normal power source 320 and provides emergency power to one or more drivers 304A based on power received from an emergency power source 312. For this reason, at least one driver 304A must be coupled, directly or indirectly, to an emergency power source 312 in order to power the corresponding light emitter 316 during the emergency condition. In addition, at least one lighting control 328 includes a relay contact configured to open the analog control lines 308 in response to detecting lack of the normal power from the normal power source 320 as well as ensure that power is supplied to the driver 304A that is to be operational during an emergency condition.

Figure 4:
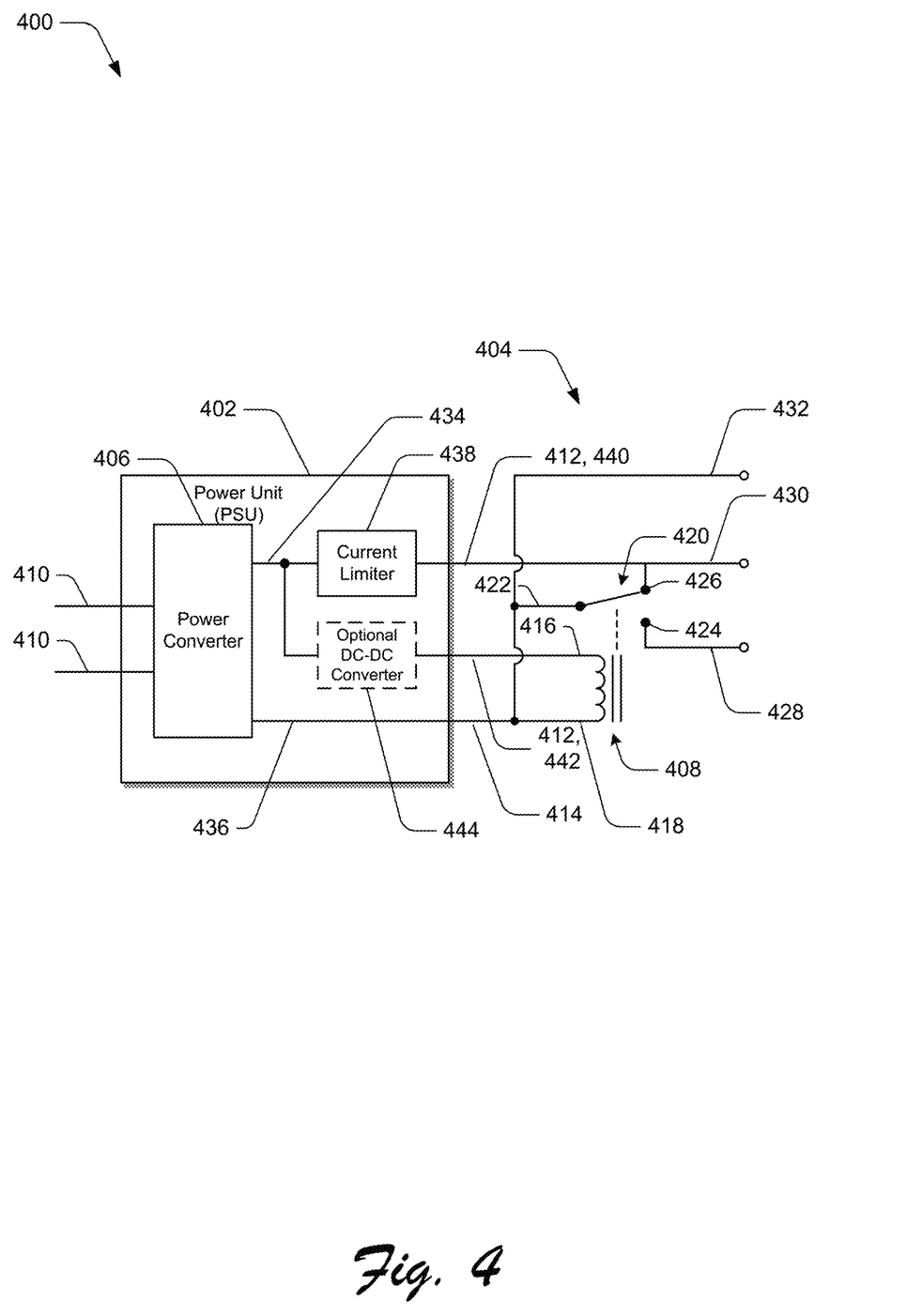
FIG. 4 is an illustration of the lighting control of FIG. 1 in an example implementation that is operable to employ techniques described herein.

Referring to FIG. 4, there is shown an illustration of the lighting control or controls 102, including implementations 206 and 306, in an example implementation 400 that is operable to employ techniques described herein. The example implementation 400 illustrates various aspect of the lighting control 102, such as a combination of a power supply unit ("PSU") or power unit 402 and a relay circuit 404. Although universal power supplies and relays have been used for other applications, the combination of the power unit 402 and the relay circuit 404 provides a unique group of advantages. In particular, the combination 402, 404 provides cost reduction and/or profit margin increase for each lighting control 102 since fewer components are required and the likelihood of wiring errors is reduced. Such wiring errors are very problematic in emergency fixture wiring that is done in the field. Also, the combination 402, 404 provides various the technical features described herein. In addition, since emergency lighting bypass of lighting controls is required by law in many jurisdictions, the combination 402, 404 implements a bypass technique that results in cost reductions, providing a better and competitive lighting control 102 over conventional systems that must use more expensive solutions.

The lighting control or controls 102 act as, or provide the functions of, a control bypass of emergency lighting for minimizing power leakage to assure proper operation of an emergency mode. It is to be understood that reference to a lighting control includes implementations of a single lighting control as well as multiple lighting controls as described herein. The power unit 402 of the lighting control 102 includes a power converter 406 and the relay circuit 404 of the lighting control includes a relay coil 408. The power unit 402 includes power inputs 410, one or more positive direct current outputs 412, and a negative direct current output 414. The power converter may be supplied with an alternating current (AC) or direct current (DC) supply power and will convert that power to a DC power using techniques commonly known to those skilled in the art such as switch mode power supply converters (SMPS), buck converters, boost converters, buck-boost converters, flyback converters, and linear voltage regulator converters. The relay coil 408 is coupled to the power unit 402, in which one end 416 of the relay coil 408 being coupled to a particular positive direct current output 412 and another end 418 of the relay coil being coupled to the negative direct current output 414.

In addition to the relay coil 408, the relay circuit 404 includes a relay contact 420 that is coupled to the power unit 402 and the relay coil 408. The relay contact portion of the relay 420 is configured to connect a relay contact input 422 to a first relay contact output 424 in response to an activation by the relay coil 408 and connect the relay contact input 422 to a second relay contact output 426 in response to a non-activation by the relay coil. The first relay contact output 424 is associated with an analog control terminal 428 of the control bypass, the second relay contact output 426 is associated with the one or more positive direct current outputs 440 of the power unit 402 and a digital control terminal 430 of the control bypass. The relay contact input 422 is associated with the negative direct current output 414 of the power unit 402 and a common terminal 432 of the control bypass. The first relay contact output 424 has a normally open position and the second relay contact output 426 has a normally closed position when the non-activation of the relay contact 420 by the relay coil 408. The digital control terminal 430 and the common terminal 432 are shorted in response to the non-activation of the relay contact 420 by the relay coil 408, and the analog control terminal 428 and the common terminal 432 are shorted in response to the activation of the relay contact by the relay coil.

Referring to FIGS. 1, 2, 3, and 4 together, the control bypass of emergency lighting, as provided by the lighting control 102, has different modes for coupling to different types of dimming systems. In particular, the control bypass has a first mode for coupling to a digital addressable lighting bus 202 which includes digital control lines 208, 210 (represented by FIG. 2) and a second mode for coupling to analog control lines 308 (represented by FIG. 3). As illustrated in FIG. 4, the digital control terminal 430 and the common terminal 432 are configured for coupling to the digital control lines 208, 210 for the first mode of the control bypass, and the analog control terminal 428 and the common terminal 432 are configured for coupling to the analog control lines 308 for the second mode of the control bypass.

In response to an emergency condition where a loss of normal power is detected by one or more lighting controls 102, the relay coil 408 is de-energized and the second relay contact output 426 would close forcing the voltage of the digital control lines 208, 210 of the digital addressable lighting bus 202 to zero. As a result, all devices dependent on the control lines for control would be aware of the emergency condition, because they would lack a power source and power units 402 would be short circuited by the relay contact 420. The emergency lighting system 104 would be in a fail-safe mode with the light output assured per the lighting specification requirements when the emergency condition exists.

Still referring to FIG. 4, for some embodiments, the power unit 402 may include a current limiter 438. The power converter 406 of the power unit 402 includes positive and negative converter outputs 434, 436. The current limiter 438 is coupled between the positive converter output 434 and the second relay contact output 426 via a positive direct current output of the power unit, such as a first positive DC output 440. Similar to the relay contacts, it is to be understood that the polarity of the power converter may be reversed without any issues. For example, the current limiter, or the delay modes (shown in FIGS. 4 & 5) may be connected to the negative terminal. The negative converter output 436 of the power converter 406 is coupled to, or is the same as, the negative direct current output 414 of the power unit 402. For this reason, the example implementation 400 depicts isolation between an output (second positive DC output 442) to a relay coil 408 and an output (first positive DC output 440) to the digital control terminal 430. Without this isolation, the output of the power unit 402 would be immediately short-circuited upon power-up, and the relay contact 420 (which is activated by the coil 408 receiving power from the power unit) would not be able activate and the lighting control 102 would not be able to start operation. If the primary power converter 406 is a "constant" voltage converter, then the current limiter 438 may serve to both create the necessary characteristics for a power unit 402 (such as, current limited to under 250 mA as required by the DALI specification) as well as provide isolation from the relay coil output. Thus, when the control lines (such as digital control lines 208, 210) are shorted by the second relay contact output 426 being closed as during startup or during normal signaling activity of the control lines, and the voltage at the second positive DC output 442 to the relay coil 408 will be unaffected.

Figure 5:
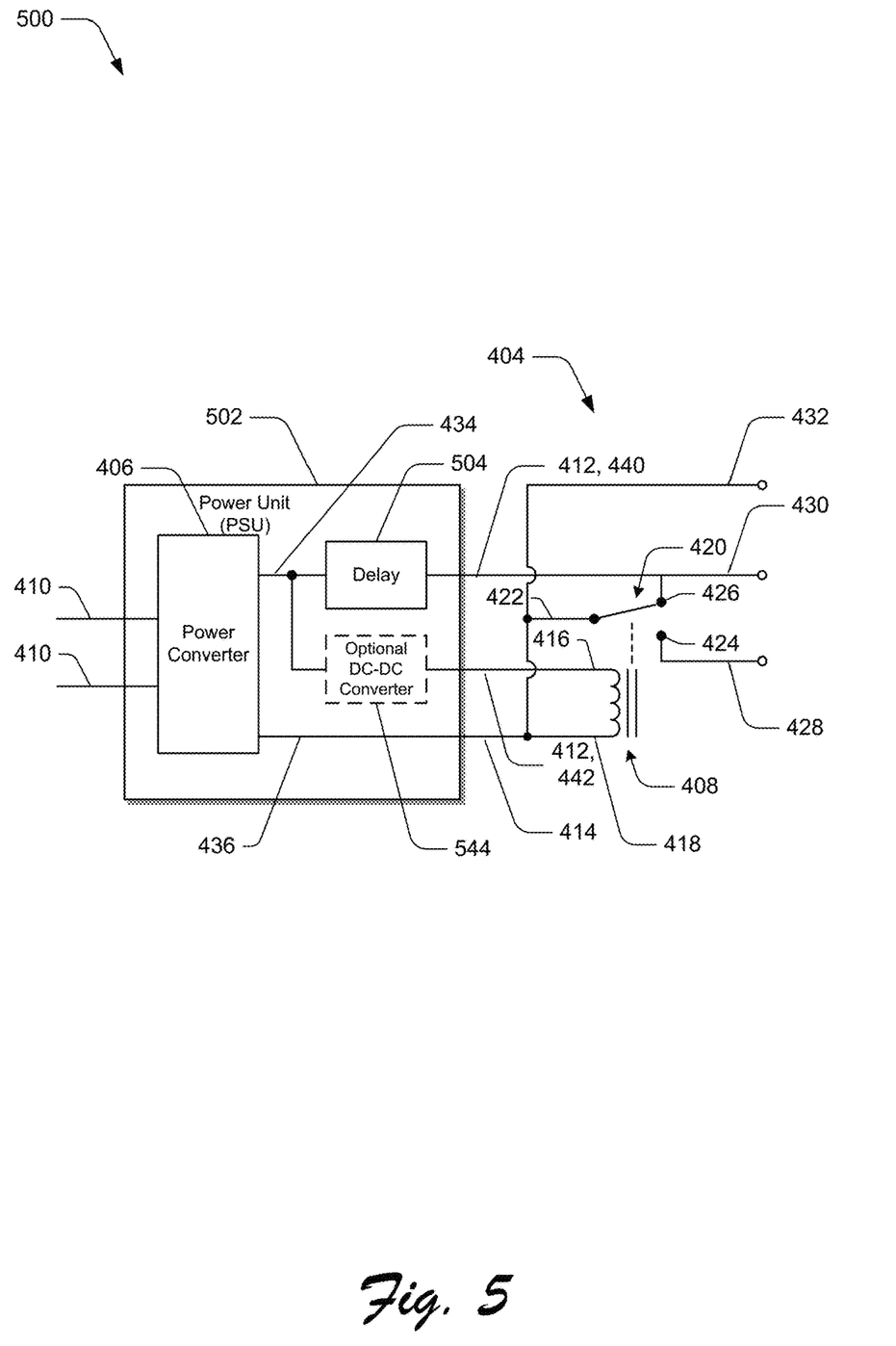
FIG. 5 is an illustration of the lighting control of FIG. 1 in another example implementation that is operable to employ techniques described herein.

Referring to FIG. 5, there is shown an illustration of the lighting control or controls 102, including implementations 206 and 306, in an example implementation 500 that is operable to employ techniques described herein. The example implementation 500 depicts another type of isolation between an output (second positive DC output 442) to a relay coil 408 and an output (first positive DC output 440) to the digital control terminal 430. For some embodiments, the lighting control 102 may include a power unit 502 having a delay circuit 504. The delay circuit 504 is coupled between the positive converter output 434 and the second relay contact output 426 via a positive direct current output, such as the first positive DC output 440. The negative converter output 436 of the power converter 406 is coupled to, or is the same as, the negative direct current output 414 of the power unit 402. For these embodiments, the delay circuit 504 adds a timing delay to activation of the output of the control lines (such as digital control lines 208, 210 or analog control lines 308). Thus, the relay 420 may energize before power-up at the terminal 430, opening the normally-closed contacts 422, 426 that would otherwise have shorted the outputs 414, 440 of the power unit 502. Once predetermined (sufficient) time has elapsed and the relay 420 is energized, the outputs 414, 440 of the power unit 502 may be connected to both the relay coil 408 and the control lines via the terminals 428-432, thus the lighting control 102 would operate properly. The selection of the relay 420 would need to be such that the normal communication on the control lines (such as the digital control lines 208, 210) would not cause it to de-energize. In view of the above, circuitry may be added to isolate the supply to the relay coil 408 from the control lines and provide a source of voltage to the relay coil while signaling on the control lines is occurring.

Referring to both FIGS. 4 and 5, for some embodiments, the power unit 402 may include a DC/DC converter (also known as a DC/DC step down) 444, 544 in addition to the current limiter 438 or the delay circuit 440. The DC/DC converter 444, 544 is coupled between the positive converter output 434 and the one end 416 of the relay coil via a positive direct current output, such as a second positive DC output 442. The negative converter output 436 is coupled to, or is the same as, the negative direct current output 414 of the power unit 402. For these embodiments, the DC/DC converter 444, 544 aligns or matches the DC voltage of commonly available relays (for example, 5, 12 or 24 VDC) which may differ from the voltage of the control lines, such as digital addressable lighting bus 202 which may be 10-22.5 VDC and commonly 16-18 VDC. The DC/DC converter 444, 544 may also provide isolation from the control lines.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A control bypass of emergency lighting for minimizing power leakage to assure proper operation of an emergency mode comprising:
   a power unit having alternating or direct current inputs, a positive direct current output, and a negative direct current output; and
   a relay coil coupled to the power unit, one end of the relay coil being coupled to the positive direct current output and another end of the relay coil being coupled to the negative direct current output; and
   a relay contact coupled to the power unit and the relay coil, the relay contact being configured to connect a relay contact input to a first relay contact output in response to an activation by the relay coil and connect the relay contact input to a second relay contact output in response to a non-activation by the relay coil,
   wherein, in a first configuration of the control bypass, a digital control terminal and a common terminal of the control bypass are coupled to digital control lines of a lighting bus for controlling a digital emergency lighting system and selectively couple the digital control terminal and the common terminal via the relay contact, and
   wherein, in a second configuration of the control bypass, an analog control terminal and the common terminal of the control bypass are coupled to analog control lines of a lighting bus for controlling an analog emergency lighting system and selectively couple the analog control terminal and the common terminal via the relay contact.

2. The control bypass as described in claim 1, wherein:
   the control bypass has a first mode for coupling to the digital control lines and a second mode for coupling to the analog control lines;

the digital control terminal and the common terminal connect the positive and negative direct current outputs to the digital control lines for the first mode of the control bypass; and the analog control terminal and the common terminal connect one of the positive and negative direct current outputs to the analog control lines for the second mode of the control bypass.

3. The control bypass as described in claim 1, wherein the first relay contact output has a normally open position and the second relay contact output has a normally closed position during the non-activation of the relay contact by the relay coil.

4. The control bypass as described in claim 1, wherein:
the digital control terminal and the common terminal are shorted in response to the non-activation of the relay contact by the relay coil; and
the analog control terminal and the common terminal are shorted in response to the activation of the relay contact by the relay coil.

5. The control bypass as described in claim 1, wherein:
the power unit includes a power converter having positive and negative converter outputs;
the power unit includes a current limiter coupled between the one of the positive and negative power converter outputs and the second relay contact output via one of the positive and negative direct current outputs; and
the other one of the positive and negative power converter outputs is coupled to the common terminal.

6. The control bypass as described in claim 1, wherein:
the power unit includes a power converter having positive and negative converter outputs;
the power unit includes a delay circuit coupled between one of the positive and negative power converter outputs and the second relay contact output via one of the positive and negative direct current outputs; and
the other one of the positive and negative power converter outputs is coupled to the common terminal.

7. The control bypass as described in claim 1, wherein:
the power unit includes a power converter having positive and negative converter outputs;
the power unit includes a DC/DC step down converter coupled between one of the positive and negative power converter outputs and the one end of the relay coil via one of the positive and negative direct current outputs; and
the other one of the positive and negative power converter outputs is coupled to the common terminal output.

8. An emergency lighting system for minimizing power leakage to assure proper operation of an emergency mode comprising:
a lighting bus including control lines interconnecting bus units of the emergency lighting system;
a driver coupled to the lighting bus, the driver receiving emergency power from at least one power source, wherein the driver has a first configuration when coupled to digital control lines and a second configuration when coupled to analog control lines, the driver provides the emergency power to a light emitter in the first configuration in response to detecting that the digital control lines of the lighting bus are shorted and the driver provides the emergency power to the light emitter in the second configuration in response to detecting that the analog control lines are open; and
a lighting controller coupled to the lighting bus, the lighting controller control receiving normal power from the at least one power source, and includes a relay contact, wherein the relay contact shorts the digital control lines in the first configuration in response to detecting lack of the normal power from the at least one power source and the relay contact opens the analog control lines in the second configuration in response to detecting lack of the normal power from the at least one power source.

9. The system as described in claim 8, wherein the analog control lines and the digital control lines are dimming and emergency control lines.

10. The system as described in claim 8, wherein:
the relay contact of the lighting controller shorts the digital control lines in response to detecting lack of the normal power from the at least one power source when the lighting controller is coupled to the digital control lines; and
the relay contact of the lighting controller opens the analog control lines in response to detecting lack of the normal power from the at least one power source when the lighting controller is coupled to the analog control lines.

11. The system as described in claim 8, wherein the lighting controller includes a dimming module to manage the illumination level of the light emitter by the driver.

12. The system as described in claim 8, wherein the lighting controller includes an emergency module to manage the emergency power provided to the light emitter in response to detecting lack of the normal power from the at least one power source.

13. An emergency lighting system for minimizing power leakage to assure proper operation of an emergency mode comprising:
a driver coupled to lighting control lines, the lighting control lines being one of digital control lines or analog control lines, the driver receiving emergency power from at least one power source, wherein the driver has a first configuration when coupled to the digital control lines to provide the emergency power to a light emitter in response to output connectors corresponding to the digital control lines being shorted and a second configuration when coupled to the analog control lines to provide the emergency power to the light emitter in response to output connectors corresponding to the analog control lines being open; and
a lighting controller coupled to the lighting control lines, the lighting controller receiving normal power from the at least one power source, and the lighting controller including a relay contact configured to short the output connectors corresponding to the digital control lines in the first configuration and open the output connectors corresponding to the analog control lines in the second configuration in response to detecting lack of the normal power from the at least one power source.

14. The system as described in claim 13, wherein the output connectors corresponding to the digital control lines and the output connectors corresponding to the analog control lines include a common terminal.

15. The system as described in claim 13, wherein the output connectors corresponding to the digital control lines include a digital control terminal and a common terminal and the output connectors corresponding to the analog control lines include an analog control terminal and the common terminal.

16. The system as described in claim 13, wherein the analog control lines and the digital control lines are dimming and emergency control lines.

17. The system as described in claim 13, wherein the lighting controller comprises a dimming module managing the illumination level of the light emitter by the driver.

18. The system as described in claim 13, wherein the lighting controller comprises an emergency module to managing the emergency power provided to the light emitter in response to detecting lack of the normal power from the at least one power source.

\* \* \* \* \*